United States Patent
Skopinski

(10) Patent No.: US 11,262,314 B2
(45) Date of Patent: Mar. 1, 2022

(54) DEVICE FOR DETECTING A DEFECT ON A SURFACE USING MULTIDIRECTIONAL LIGHTING

(71) Applicant: FRAMATOME, Courbevoie (FR)

(72) Inventor: Clément Skopinski, Chalon sur Saone (FR)

(73) Assignee: FRAMATOME, Courbevoie (FR)

( * ) Notice: Subject to any disclaimer, the term of this patent is extended or adjusted under 35 U.S.C. 154(b) by 0 days.

(21) Appl. No.: 16/613,721

(22) PCT Filed: May 23, 2018

(86) PCT No.: PCT/EP2018/063437
§ 371 (c)(1),
(2) Date: Nov. 14, 2019

(87) PCT Pub. No.: WO2018/215504
PCT Pub. Date: Nov. 29, 2018

(65) Prior Publication Data
US 2020/0072758 A1    Mar. 5, 2020

(30) Foreign Application Priority Data
May 24, 2017 (FR) ...................................... 1754637

(51) Int. Cl.
*G01N 21/88* (2006.01)
(52) U.S. Cl.
CPC ................. *G01N 21/8806* (2013.01)
(58) Field of Classification Search
CPC ............. G01N 21/956; G01N 21/8806; G01N 21/95607; G01N 15/14; G01N 23/2251;
(Continued)

(56) References Cited

U.S. PATENT DOCUMENTS

| 5,754,283 A | 5/1998 | Keane et al. |
| 6,842,250 B2 * | 1/2005 | Schwarz .................... G01J 3/02 356/445 |

(Continued)

FOREIGN PATENT DOCUMENTS

| DE | 3540288 A1 | 1/1987 |
| JP | 2009014617 A * | 1/2009 |

(Continued)

OTHER PUBLICATIONS

English translation of JP 2009014617 A.*
Corresponding Search Report PCT/EP2018/063437.

*Primary Examiner* — Mesfin T Asfaw
(74) *Attorney, Agent, or Firm* — Davidson, Davidson & Kappel, LLC

(57) ABSTRACT

A device for detecting a defect on a surface including an optical device (14) suitable for acquiring an image of the surface in a given optical direction, a lighting device (15) comprising a plurality of light sources (16), the light sources (16) being arranged in a hemisphere (20), each light source (16) having an off and an on state, an electronic calculation device (18). The electronic calculation device (18) is able to control the optical device (14) and the lighting device (15) so that the optical device (14) acquires a plurality of images of the surface, different light sources (16) or different combinations of light sources (16) being switched on for each image, the hemisphere (20) having a diameter D smaller than or equal to 50 mm.

12 Claims, 3 Drawing Sheets

(58) Field of Classification Search
CPC .......... G01N 15/0806; G01N 15/1012; G01N 15/1459; G01N 21/8851; G01N 2021/8845; G01N 21/88; G01N 15/06; G01N 15/1475; G01N 1/00; G01N 2015/1018; G01N 2015/1486; G01N 2015/149; G01N 2015/1493; G01N 2021/4711; G01N 2021/646; G01N 2021/8825; G01N 21/39; G01N 21/645; G01N 21/94; G01N 2201/06113; G01N 23/046; G01N 23/223; G01N 29/4445; G01N 15/00; G01N 15/02; G01N 15/04; G01N 15/0612; G01N 15/10; G01N 15/1463; G01N 1/18; G01N 1/2202; G01N 1/2226; G01N 1/40; G01N 2001/002; G01N 2015/0042; G01N 2015/1087; G01N 2015/1093; G01N 2015/1497; G01N 2021/1765; G01N 2021/8835; G01N 2021/8854; G01N 2021/8883; G01N 2021/9513; G01N 21/55; G01N 21/95; G01N 21/474; G01N 21/8422; G01N 21/57; G01N 21/9515; G01N 21/255; G01N 21/8901; G01N 21/9036; G01N 21/95684; G01B 11/24; G02B 21/125; G02B 21/367; H04N 5/2256; G03F 7/70483

See application file for complete search history.

(56) References Cited

U.S. PATENT DOCUMENTS

2004/0239919 A1* 12/2004 Schwarz ............... G01N 21/57
356/237.2
2015/0330905 A1 11/2015 Sato et al.

FOREIGN PATENT DOCUMENTS

JP 2012047673 A 3/2012
WO WO02090952 A1 11/2002

* cited by examiner

DEVICE FOR DETECTING A DEFECT ON A SURFACE USING MULTIDIRECTIONAL LIGHTING

The present invention relates to a device for detecting a defect on a surface.

BACKGROUND

One current device essentially consists of an optical device capable of acquiring an image or a film of the surface. Said image or film is next viewed by an operator, who indicates the defects that he has identified.

However, the operator may not identify a defect due to lack of attention. Furthermore, the criteria making it possible to judge a defect are subjective, i.e., the definition of what constitutes a defect may vary depending on the operator.

One solution often implemented to address these problems is to have the film or image viewed by several operators. Furthermore, surface image examples are used in order to show what is or is not a defect.

SUMMARY

However, the examples shown are neither exhaustive nor reproducible.

In the event of a defect, experts are consulted. Many discussions between experts then take place, the experts not necessarily agreeing with one another.

The analysis of a surface may be time-consuming and complex.

The present disclosure aims to resolve this drawback by providing a device allowing a simple and safe detection of a defect on a surface.

To that end, a device for detecting a defect on a surface, the detection device is provided including:

an optical device having an optical axis, the optical device being able to acquire an image of the surface along a given optical direction, a lighting device comprising a plurality of light sources, the light sources being arranged in a hemisphere, each light source having an off state and an on state, each light source having a lighting direction, an electronic calculation device, the electronic calculation device is able to control the optical device and the lighting device so that the optical device acquires a plurality of images of the surface, different light sources or different combinations of light sources being switched on for each image, the hemisphere having a diameter D smaller than or equal to 50 mm.

The detection device according to the invention may further include one or more of the following features, considered alone or according to any technically possible combination(s):

the optical device is immobile relative to the hemisphere;

the detection device comprises a bearing surface able to be placed in contact with the surface;

the optical direction of the optical device is substantially perpendicular to a bearing surface of the device able to be placed in contact with the surface;

the bearing surface is a ring, the inner radius of which corresponds to a radius of the hemisphere;

the detection device comprises an adapting piece having a first end able to be mounted on the bearing surface and a second end able to cooperate with the surface;

the lighting device comprises a first number of light sources, the first number being greater than or equal to six, each light source having a different lighting direction, for each acquired image, a single light source or a defined combination of sources being illuminated, the single light source or combination being different for each acquired image;

the light sources have respective light intensities identical to one another;

the detection device comprises a tool comprising the optical device and the lighting device;

the tool comprises a handle able to be grasped by a user;

the tool comprises a head defining a concavity defining an inner surface corresponding to the hemisphere of the lighting device; and the concavity is open, the bearing surface extending around an edge of the concavity.

BRIEF SUMMARY OF THE DRAWINGS

The invention will be better understood using the following description, provided solely as an example and done in reference to the appended figures, in which.

DETAILED DESCRIPTION

Figure 1:
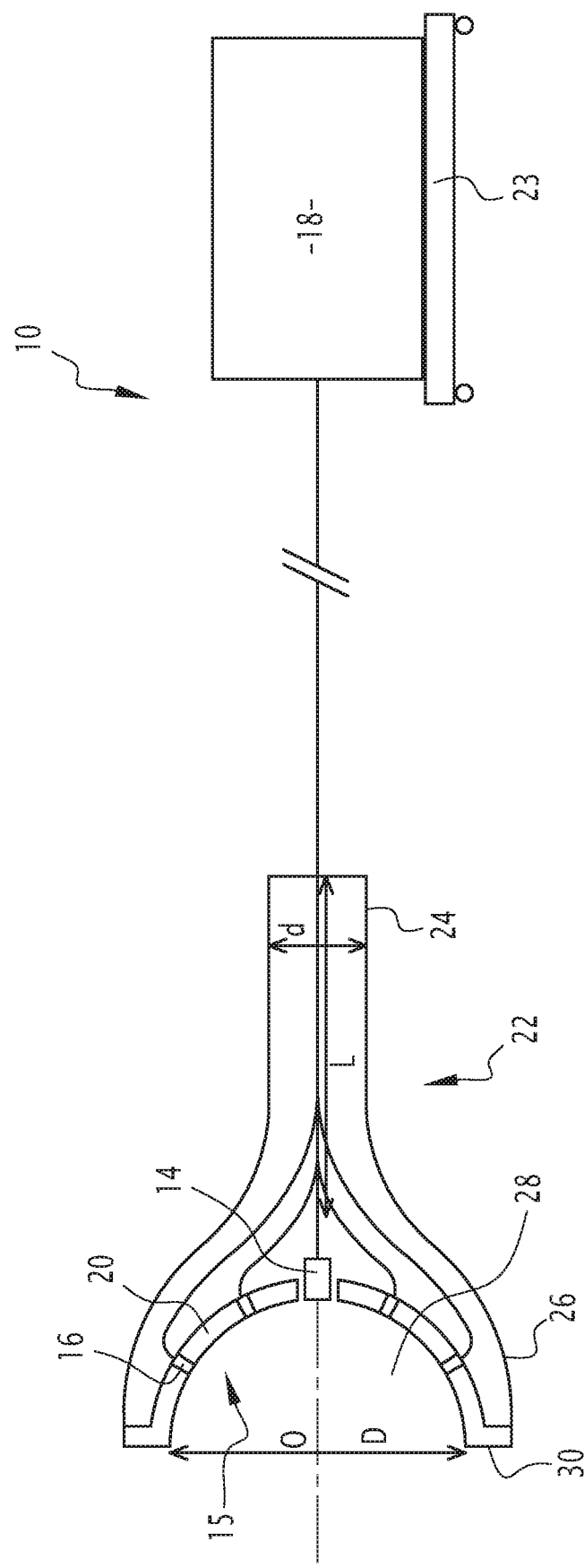
FIG. 1 is a schematic sectional view of an exemplary device according to one embodiment of the invention.
Figure 2:
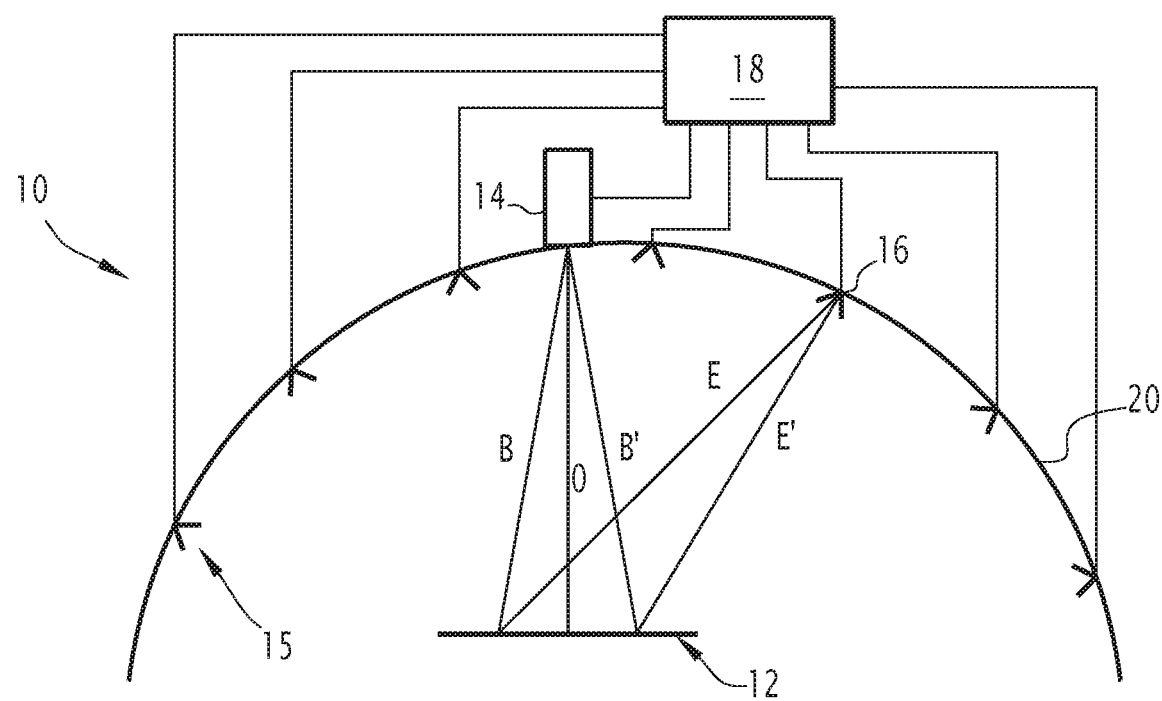
FIG. 2 is a schematic view of the device of FIG. 1.

An exemplary device 10 for detecting a defect in a surface 12 is shown in FIGS. 1 and 2.

The detection device 10 includes an optical device 14, a lighting device 15 including a first number of light source(s) 16 and an electronic calculating device 18.

The optical device 14 has an optical axis aligned with a given optical direction O. It has an acquisition field.

The optical device 14 is able to acquire an image of the surface 12 along the given optical direction O. The acquisition field coincides with the surface 12 to be inspected, such that the acquired image represents the surface 12.

The optical device for example comprises, as input, an optic adapting the image acquired by the optical device, for example, the acquisition field.

For each point of the surface, an observation direction B, B' is defined between the optical device 14 and the point of the surface 12.

Here, the acquisition field is fixed.

The optical direction O is typically substantially perpendicular to the surface 12. Alternatively, the optical direction O is not substantially perpendicular to the surface 12.

The optical device 14 is for example a camera.

The optical device 14 is, more particularly, a charge-coupled device (CCD), or a CMOS (complementary metal oxide semiconductor) sensor.

Alternatively, the acquisition field coincides with only part of the surface 12 and the detection device 10 is able to be moved relative to the surface 12 so as to be able to acquire all of the surface 12 in several parts.

Each acquired image is made up of a matrix of pixels with size i*j, with i the number of horizontal lines and j the number of vertical lines of the matrix, with at least one of the two parameters (i,j) greater than 1. The pixel is for example a rectangle of size denoted h*L, with h being its height and L being its width. The height h is equal to the width L. Alternatively, the height is different from the width.

Hereinafter, "point of the surface" indifferently refers to a pixel of an acquired image or a part of the surface acquired in a pixel.

The light sources 16 are capable of lighting the surface 12.

For each point of the surface, the light sources 16 each have a given lighting direction E, E' connecting the light source to the point of the surface 12. The lighting direction is different for each light source.

The light sources 16 are typically arranged in a hemisphere 20 surrounding the surface 12.

The hemisphere has a diameter D smaller than or equal to 50 mm (millimeters), preferably less than or equal to 20 mm.

The diameter D is also strictly greater than 5 mm.

The first number of light sources 16 is for example greater than or equal to six, more particularly greater than twenty. The first number is for example between 32 and 128, more particularly equal to 96.

The light sources 16 are for example light-emitting diodes (LED).

They may be turned off or on. They are configured to be able to be turned on independently of one another.

The light sources 16 typically have an identical lighting intensity.

Alternatively, the lighting device 15 includes one or several lights that may not be identical.

The electronic calculating device 18 is for example a computer, a calculator, a computing module, at least one programmable logic component, such as an FPGA (Field-Programmable Gate Array), or at least one dedicated integrated circuit such as ASIC (Application-Specific Integrated Circuit).

The electronic calculating device 18 is for example connected to the optical device 14 and the lighting device 15.

The connection is, for example, done by cables.

Alternatively, the connection between the electronic calculating device 18 and the optical device 14 and/or the lighting device 15 is done by wireless technology. The wireless technology is for example according to a Wi-Fi protocol corresponding to a set of wireless communication protocols governed by the standards of the IEEE 802.11 group (ISO/CEI 8802-11).

The electronic calculating device 18 is able to turn each of the light sources 16 on or off independently of one another.

The electronic calculating device 18 is further provided to trigger the acquisition of at least one image of the surface by the optical device 14.

It is thus configured to drive the acquisition of a plurality of images of the surface by the optical device 14, each image being acquired along the given optical direction O and with a single illuminated light source or a defined combination of illuminated unique sources. This source or this combination is different for each image. Each image corresponds to different lighting.

For each point of the surface, the electronic calculating device 18 is configured to calculate, from acquired images, a plurality of parameters, the parameters including coefficients of an equation characterizing the response of said point of the surface as a function of the lighting direction and an observation direction, then to deduce from the calculated parameters whether the surface has a defect at said point.

This last point is described in detail below in connection with the method for detecting a defect.

Here, the device 10 comprises a tool 22 comprising the optical device 14 and the lighting device 15.

In the illustrated example, the electronic calculating device 18 is placed outside the tool 22.

In the case of a connection of the electronic calculating device 18 with the optical device 14 and/or the lighting device 15 by cable, the electronic calculating device 18 is, for example, placed on a movable support 23. The support 23 for example comprises casters.

The tool 22 has dimensions such that it is comprised in a cylinder having a length equal to 200 mm, more particularly equal to 150 mm, and a diameter equal to 100 mm, more particularly equal to 75 mm.

The tool 22 has a mass of less than 3 kg (kilograms), more specifically less than 2 kg.

The tool comprises a handle 24 and a head 26 that are secured to one another. The tool 22 is for example made up of the handle 24 and the head 26.

The handle 24 and the head 26 are immobile relative to one another. They are for example integral.

In a variant, the handle 24 and the head 26 are secured in a connecting zone, the handle 24 being able to be moved relative to the head 26 according to a pivot link or a ball-and-socket connection.

The handle 24 is able to be grasped by a user.

It extends primarily along the longitudinal direction, for example, aligned with the optical direction O.

The handle 24 is substantially cylindrical.

Here, the head 26 comprises the optical device 14 and the lighting device 15.

The head 26 defines a concavity 28.

The concavity 28 is open, that is to say, it communicates with the outside of the tool 22.

The concavity 28 is open opposite the handle 24.

The concavity defines an inner shape corresponding to the hemisphere 20 of the lighting device 15.

The head 26 is connected to the handle 24 at a point aligned along the second longitudinal direction of the handle 24 with the apex of the hemisphere 20. More particularly, the handle 24 is aligned along its longitudinal direction with the apex of the hemisphere 20.

The light sources 16 are capable of lighting the concavity 28.

The optical device 14 is placed at the apex of the hemisphere 20.

The optical axis of the optical device 14 extends in the concavity 28.

The head 26 is able to be pressed in contact with the surface 12. More particularly, it comprises a bearing surface 30 able to be placed in contact with the surface 12, such that the surface 12 is able to be lighted with the lighting device 15 and acquired with the optical device 14.

The bearing surface 30 is suitable for the concavity 28 of the head 26 to form a closed space when the bearing surface 30 is placed in contact with the surface 12.

The bearing surface 30 extends around a circle defining an edge of the concavity 28.

The bearing surface 30 is comprised in a plane substantially perpendicular to the optical direction O of the optical device 14.

The bearing surface 30 is a ring, an inner radius of which corresponds to a radius of the hemisphere 20 of the lighting device 15.

The tool 22 further comprises at least one adapting piece having a generally cylindrical shape extending between a first and a second end surface. The first end surface is able to cooperate with the bearing surface 30. The second end surface is able to cooperate with the surface 12 on which the tool is suitable for being applied. In particular, if the surface 12 is curved, the second end surface is a ring having a curvature similar to the surface. The adapting piece is, for example, opaque, such that the light is kept in the space defined between the light sources 16, the surface 12 and the adapting piece.

In a variant, the electronic calculating device 18 is comprised in the tool 22, more particularly in the handle 24.

A method for detecting a defect in a surface will now be described in light of FIG. 2.

The method is implemented here by the device previously described.

The method comprises the following steps:
acquisition 100,
calculating parameters 102, and
deducing the presence of a defect 104.

During the acquisition 100, the device 10 is placed in contact with the surface 12, more particularly at the bearing surface 30 of the device 10.

If the surface 12 is curved, an adapting piece is advantageously used between the tool and the surface 12 allow a better adaptation of the tool on the surface.

Figure 3:
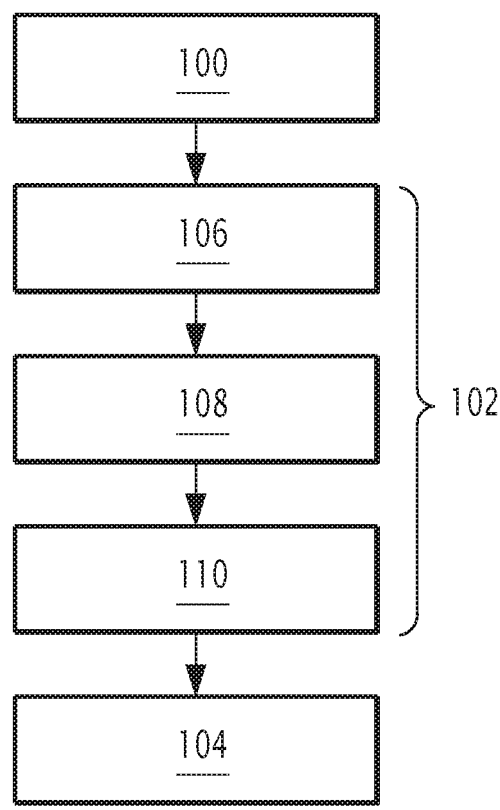
FIG. 3 is a diagram of steps of an embodiment of the method implementing a device of the invention.

During the acquisition 100, a plurality of images 200 of the surface is acquired by the optical device 14. One such image is shown in FIG. 3.

Each image 200 is acquired with a lighting of the surface 12 along a given lighting direction E, E' for each point of the surface and with the optical axis of the optical device 14 along a given optical direction O.

The images 200 are acquired with different lighting directions E, E' or combinations of lighting directions.

In the illustrated embodiment, the lighting directions E, E' differ for each acquired image and the optical direction O is invariable and substantially perpendicular to the surface 12.

For each acquired image, a unique light source or a defined combination of unique sources 16 of the lighting device is lighted, the unique light source or the combination being different for each acquired image.

The set of light sources or combinations is lighted in turn, so as to acquire one image per light source or per combination. Alternatively, certain sources or combinations are not lighted.

Then, during the calculation of parameters 102, for each point 202 of the surface, i.e., here for each pixel of the acquired images, a plurality of parameters is calculated from the acquired images.

The parameters are calculated from coefficients of an equation characterizing the response of said point of the surface as a function of the lighting direction E, E' and an observation direction B, B'.

For each point 202 of the surface 200, the calculation of the parameters 102 here includes the following steps:
defining a property 106,
choosing a model 108, and
calculating coefficients 110.

During the definition of a property 106, a property evolving as a function of the acquired images is defined.

For example, the property here is the gray intensity of the point of the surface, the gray intensity being variable depending on the acquired images.

In parallel, a model depicting the evolution of the property is chosen 108. The model depends on the lighting direction(s) E, E' and/or the observation direction B, B'. The model includes coefficients.

Here the model depends solely on the lighting direction. It for example assumes the following form: $G(E)=a_0 \times D_u^2 + a_1 \times D_v^2 + a_2 \times D_u \times D_v + a_3 \times D_u + a_4 \times D_v + a_5$, with G the property, E the lighting direction, $a_0$, $a_1$, $a_2$, $a_3$, $a_4$ and $a_5$ the coefficients and $D_u$ and $D_v$ being the coordinates of the vector connecting the lighting source to the point of the surface.

The coefficients $a_0$, $a_1$, $a_2$, $a_3$, $a_4$ and $a_5$ here are undetermined.

Then, during the calculation of the coefficients 110, an application of the property on the model is done so as to calculate the values of $a_0$, $a_1$, $a_2$, $a_3$, $a_4$ and $a_5$.

The parameters here are equal to the coefficients $a_0$, $a_1$, $a_2$, $a_3$, $a_4$ and $a_5$ thus calculated.

For each point of the surface, the same property and the same model are defined. Thus for each point of the surface, parameters $a_0$, $a_1$, $a_2$, $a_3$, $a_4$ and $a_5$ are obtained. One for example obtains a map of the surface showing the values of the parameters for each point of the surface.

Figure 4:
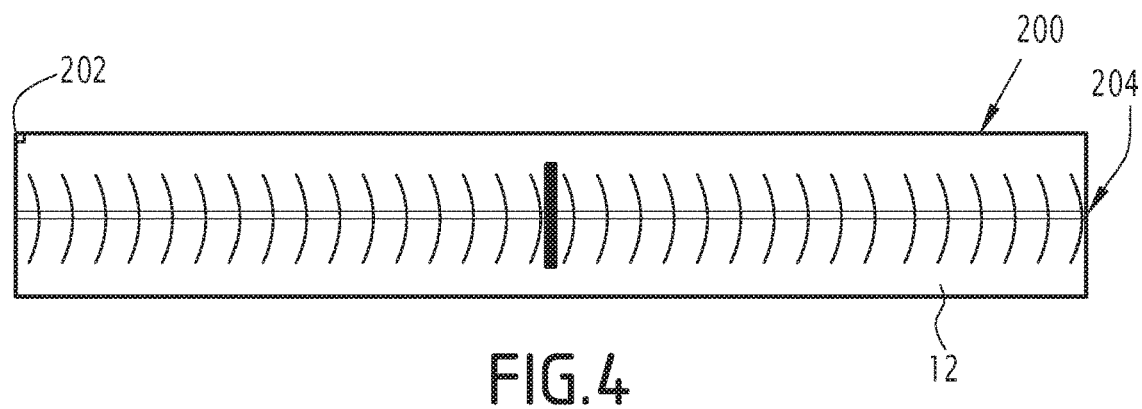
FIG. 4 is an example surface on which the detection device of FIG. 1 is used.
Figure 5:
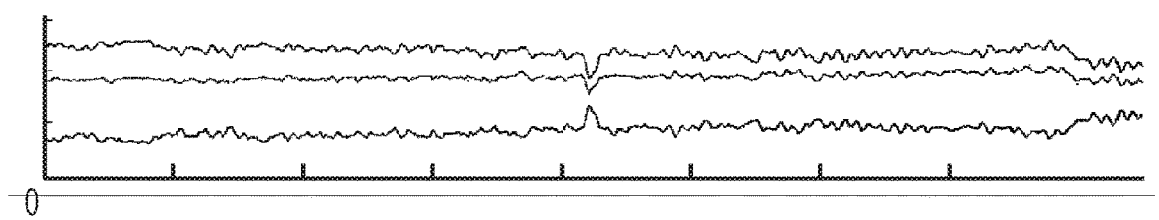
FIG. 5 is an example of the evolution of three parameters on a line of the surface of FIG. 4.

FIG. 5 shows the evolution of three parameters along the line 204 of points of the surface shown in FIG. 4.

Alternatively, the parameters are other values calculated from the coefficients.

When deducing the presence of a defect 104, it is deduced from the calculated parameters whether the surface has a defect at said point.

Figure 7:
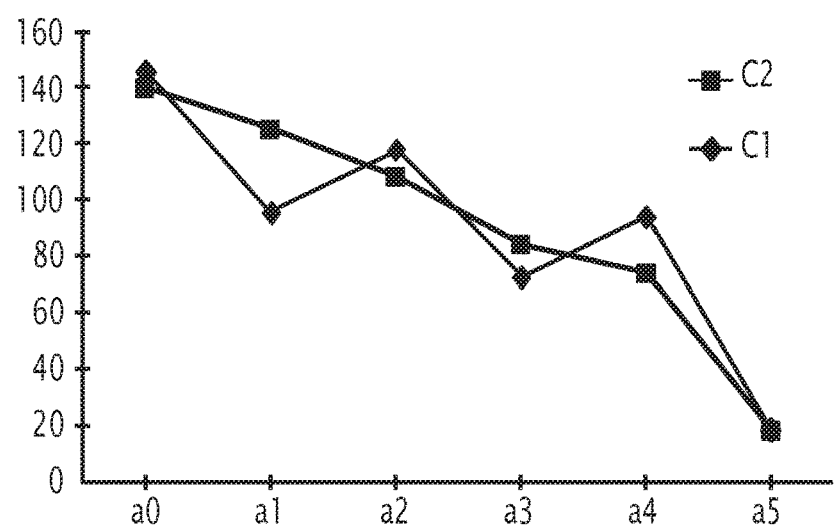
FIG. 7 is an example of parameters at a set of points having a defect and a set of points not having a defect.

In FIG. 7, for example, the parameters are shown with the curve $C_1$ at a point not having a defect and with the curve $C_2$ at a point having a defect.

The result obtained in step 104 for each point is for example a Boolean showing, in a binary manner, whether a defect is detected at said point.

Figure 6:
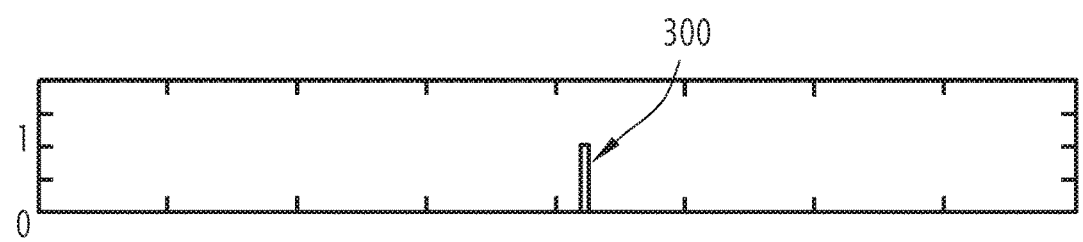
FIG. 6 is an example defect detection on the surface of FIG. 4.

FIG. 6 shows the Boolean along the line 204: if the Boolean is equal to 0, no defect is detected; if the Boolean is equal to 1, a defect is detected.

Thus, in FIG. 6, a single defect 300 is detected and extends over several adjacent points.

One or several criteria are used to deduce the presence of a defect from the parameters. These criteria are described below and are used alone or in combination in order to detect a defect. For example, a defect is detected when at least two of the criteria are validated.

A first criterion is that a defect is detected at said point when at least one parameter at said point is not comprised in an interval.

More particularly, the interval is centered around the mean value of said parameter over the set of points of the surface.

Alternatively, the interval is a given interval.

Alternatively, a defect is detected at said point when at least a given number of parameters at said point are not comprised in a respective interval.

A second criterion is that a defect is detected at said point when at least one parameter at said point differs from a value chosen as detection threshold relative to the background noise of said parameter at an adjacent point, the surface not having a defect at the adjacent point.

Thus, the surface is analyzed from one to the next.

It is then appropriate to define at least a first point of the surface for which a defect is not present.

Alternatively, the electronic calculating device 18 considers that a location of the surface is free of defects and, from one to the next, detects defects in the surface. If the result is deemed unacceptable, for example, if a majority of the surface is detected as having a defect, then the step is reiterated considering that another location, different from the previous one, is free of defects.

A third criterion is based on the geometry of a signal.

The signal here is the evolution of one or several parameters over a defined set of points. The points of the set here are adjacent. The set of points is for example a zone centered on a central point.

Patterns are defined corresponding to cases in which a defect is detected and/or in which no defect is detected. The shape of the signal is compared to the patterns, so as to decide whether a defect is detected. The defect is detected at the central point, in a zone including the central point and included in the set of points or in the set of points.

Thus, for each point of the surface, it is deduced from the parameters whether a defect is present.

This is for example able to be depicted on a binary map of the surface in order to view the defects easily.

Alternatively, the light sources 16 do not have an identical lighting intensity. A calibration of the device is then done.

Advantageously, in addition to deducing the presence of a defect, the method comprises a step for categorizing the nature of the defect.

Based on the criteria previously described, the nature of a defect is able to be defined, for example, between a crack, a scratch, a deformation or a porosity.

In a variant, the calculation of the parameters 102 is based on another mathematical model such as the bidirectional reflectance distribution function (BRDF) or the discrete modal decomposition (DMD) or the bidirectional texture function (BTF).

The direct deduction from parameters calculated from acquired images in particular makes it possible to do away with the susceptibility to the presence of a defect varying based on the operators. The method thus makes it possible to obtain a unique and objective result. Thus, the method is made simpler and secure.

The tool has smaller dimensions. This in particular makes it possible to inspect a surface with reduced accessibility. This in particular makes it possible to decrease the unpleasantness of the task of the user implementing the detection device, since the tool is easily portable by the user, in particular owing to its handle.

Furthermore, the detection device is movable by a user or a robotic system. This in particular makes it possible to implement the inspection of a surface easily.

What is claimed is:

1. A detection device for detecting a defect on a surface, the detection device comprising:
    an optical device having an optical axis, the optical device configured to acquire an image of the surface along a given optical direction;
    a lighting device comprising a plurality of light sources, the light sources being arranged in a hemisphere, each light source having an off state and an on state, each light source having a lighting direction; and
    an electronic calculation device,
    the electronic calculation device configured to control the optical device and the lighting device so that the optical device acquires a plurality of images of the surface, a different one of the light sources or different combinations of the light sources being switched on for each image,
    the hemisphere having a diameter smaller than or equal to 50 millimeters,
    wherein the lighting device comprises a first number of light sources, the first number being greater than or equal to six, each light source having a different lighting direction, for each acquired image, a single light source or a defined combination of sources being illuminated, the single light source or combination being different for each acquired image, and
    wherein the light sources have respective light intensities identical to one another, the light sources being identical to one another,
    wherein the electronic calculation device is further configured to calculate, from the acquired images, a plurality of parameters, the parameters comprising coefficients of a model depicting an evolution of a property as a function of the acquired images, and to deduce a presence of a defect from the parameters by comparing a representation of the parameters to a pattern.

2. The detection device according to claim 1, wherein the optical device is immobile relative to the hemisphere.

3. The detection device according to claim 2, further comprising a bearing surface configured to be placed in contact with the surface.

4. The detection device according to claim 3, wherein the optical direction of the optical device is substantially perpendicular to the bearing surface of the device configured to be placed in contact with the surface.

5. The detection device according to claim 1, further comprising a bearing surface configured to be placed in contact with the surface.

6. The detection device according to claim 5, wherein the bearing surface is a ring, the inner radius of which corresponds to a radius of the hemisphere.

7. The detection device according to claim 5, further comprising an adapting piece having a first end configured to be mounted on the bearing surface and a second end configured to cooperate with the surface.

8. The detection device according to claim 1, further comprising a tool comprising the optical device and the lighting device.

9. The detection device according to claim 8, wherein the tool comprises a handle configured to be grasped by a user.

10. The detection device according to claim 8, wherein the tool comprises a head defining a concavity defining an inner surface corresponding to the hemisphere of the lighting device.

11. The detection device according to claim 10, further comprising a bearing surface configured to be placed in contact with the surface, the concavity being open, the bearing surface extending around an edge of the concavity.

12. The detection device according to claim 1, wherein the property is a grey intensity of a point of the surface.

* * * * *